United States Patent [19]
Tran

[11] Patent Number: 5,822,575
[45] Date of Patent: Oct. 13, 1998

[54] BRANCH PREDICTION STORAGE FOR STORING BRANCH PREDICTION INFORMATION SUCH THAT A CORRESPONDING TAG MAY BE ROUTED WITH THE BRANCH INSTRUCTION

[75] Inventor: Thang M. Tran, Austin, Tex.

[73] Assignee: Advanced Micro Devices, Inc., Sunnyvale, Calif.

[21] Appl. No.: 713,287

[22] Filed: Sep. 12, 1996

[51] Int. Cl.$^6$ ...................................................... G06F 9/38
[52] U.S. Cl. ........................................... 395/586; 395/394
[58] Field of Search .................................... 395/393, 394, 395/567, 585, 586, 800.23

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,807,115 | 2/1989 | Torng | 395/391 |
| 4,858,105 | 8/1989 | Kuriyama et al. | 395/391 |
| 4,928,223 | 5/1990 | Dao et al. | 395/597 |
| 5,053,631 | 10/1991 | Perlman et al. | 364/748 |
| 5,058,048 | 10/1991 | Gupta et al. | 364/748 |
| 5,129,067 | 7/1992 | Johnson | 395/389 |
| 5,136,697 | 8/1992 | Johnson | 395/586 |
| 5,226,126 | 7/1993 | McFarland et al. | 395/394 |
| 5,226,130 | 7/1993 | Favor et al. | 395/585 |
| 5,487,156 | 1/1996 | Popescu et al. | 395/393 |
| 5,574,871 | 11/1996 | Hoyt et al. | 395/376 |
| 5,604,912 | 2/1997 | Iadonato et al. | 395/800.23 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

Primary Examiner—Parshotam S. Lall
Assistant Examiner—Viet Vu
Attorney, Agent, or Firm—Conley, Rose & Tayon, PC; B. Noel Kivlin; Larry Merkel

[57] ABSTRACT

A prediction storage for branch predictions and information corresponding to branch instructions which are outstanding within an instruction processing pipeline of a microprocessor. A branch tag is assigned to each branch instruction and the corresponding branch prediction and prediction information is stored into the prediction storage. The branch tag is routed through the instruction processing pipeline with the branch instruction. Branch prediction information corresponding to the instruction remains within the branch prediction storage apparatus, which may be integrated into a branch predictor or coupled nearby. The branch tag may be more easily routed through the pipeline since the branch tag may include fewer bits than the corresponding branch prediction information. The branch prediction information may be updated after correct or incorrect prediction by conveying an indication of the prediction or misprediction and the branch tag of the branch instruction to the branch prediction storage apparatus.

27 Claims, 10 Drawing Sheets

BRANCH PREDICTION STORAGE FOR
STORING BRANCH PREDICTION
INFORMATION SUCH THAT A
CORRESPONDING TAG MAY BE ROUTED
WITH THE BRANCH INSTRUCTION

BACKGROUND OF THE INVENTION

1. Field of the Invention

This invention is related to the field of microprocessors and, more particularly, to branch prediction mechanisms within microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Superscalar microprocessor rely upon highly accurate branch prediction mechanisms to support multiple instruction dispatch and execution. In many common computer programs, a branch instruction may occur every 3–4 instructions on the average. Additionally, branch instructions are often conditional based upon the results of executing an instruction prior to the branch instruction in program order. In other words, a branch instruction will cause program execution to continue at the target address of the branch instruction if a previous instruction generates one result when executed, and will cause program execution to continue with the instruction immediately subsequent to the branch instruction in memory ("the sequential instruction") if the previous instruction generates another result. Therefore, the instructions to be fetched and dispatched subsequent to the branch instruction depend upon the dynamics of the instructions being executed. Awaiting execution of the previous instruction and the branch instruction before fetching and dispatching subsequent instructions would degrade performance of the microprocessor, particularly given the high frequency of branch instructions in many programs. Additionally, branch prediction mechanisms with low rates of accuracy will lead to frequent erroneous fetching and dispatching of instructions (i.e. instructions which are not within the actual instruction stream being executed). Performance of the microprocessor suffers due to the lack of accuracy.

Highly accurate branch prediction mechanisms become even more important when the instruction processing pipeline includes a large number of stages. The results of instruction execution are not available until the instruction reaches the later stages of the pipeline. Therefore, branch misprediction (detected when the branch instruction is executed) is not detected until many instructions have been fetched and dispatched from the mispredicted instruction stream. All of these instructions must be discarded, and new instructions fetched at the beginning of the instruction processing pipeline. Recent microprocessor design trends have been to higher frequencies and longer instruction processing pipelines, furthering the need for highly accurate branch prediction mechanisms.

Unfortunately, creating highly accurate branch prediction mechanisms often requires storing a larger amount of branch prediction information corresponding to each branch instruction than was previously the case. For example, a branch prediction mechanism may store branch prediction information with each cache line. Such a branch prediction mechanism may increase the number of branch predictions stored per cache line, such that more branch instructions within a single cache line may be identified. Additionally, saturating counters indicating the taken/not taken nature of previous executions of the branch instruction may be stored where previously a single taken/not taken bit may be employed. Generally speaking, branch prediction information comprises information stored with respect to a particular branch instruction and interpreted in order to form a branch prediction for the particular branch instruction. Often, branch prediction information includes a history of recent executions of the particular branch instruction. The history is interpreted by branch prediction logic to predict subsequent behavior of the branch instruction. For example, the single taken/not taken bit is a history of the most recent execution of the branch instruction. Typically, the branch is predicted to behave the same way it did during the previous execution.

Generally, the branch prediction information is transmitted with the branch instruction through the instruction processing pipeline of the microprocessor. The branch prediction information is compared to the actual execution of the instruction, and is updated to reflect that execution. Subsequently, the updated information is stored back into the branch predictor for use the next time the branch instruction is fetched. Unfortunately, conveying the branch prediction information through the instruction processing pipeline becomes expensive in terms of wiring between pipeline stages and storage circuits therein as the amount of branch prediction information increases.

SUMMARY OF THE INVENTION

The problems outlined above are in large part solved by a branch prediction storage apparatus in accordance with the present invention. The apparatus includes a prediction storage for storing branch predictions and branch prediction information corresponding to branch instructions which are outstanding within an instruction processing pipeline of a microprocessor employing the apparatus. A branch tag is assigned to each branch instruction as the instruction is fetched, and the corresponding branch prediction and prediction information is stored into the prediction storage. The branch tag is routed through the instruction processing pipeline with the branch instruction. Advantageously, branch prediction information corresponding to the instruction remains within the branch prediction storage apparatus, which may be integrated into a branch predictor or coupled nearby. The branch tag may be more easily routed through the pipeline since the branch tag may include fewer bits than the corresponding branch prediction information. Still further, the branch tag identifies the corresponding branch prediction information. The branch prediction information may be updated due to misprediction by conveying an indication of the misprediction and the branch tag of the mispredicted branch instruction to the branch prediction storage apparatus. The apparatus then forwards the appropriate information, with corrections, to the branch predictor for storage. Branch prediction information may be updated with respect to branch instruction execution in a similar fashion.

Broadly speaking, the present invention contemplates an apparatus configured to store branch predictions comprising a storage and a control unit. The storage is configured to store branch prediction information used to generate a branch prediction for a branch instruction. Coupled to the storage, the control unit is configured to assign a first branch tag identifying the branch prediction information within the storage. The first branch tag accompanies the branch instruction through an instruction processing pipeline.

The present invention further contemplates a method for handling branch predictions. Branch prediction information used to generate a branch prediction for a branch instruction is stored in a storage. A branch tag is assigned to the branch instruction. The branch tag identifies the branch prediction information within the storage. The branch tag is returned to the storage upon retirement of the branch instruction. The branch prediction information is deleted from the storage subsequent to the return.

The present invention still further contemplates a microprocessor comprising a branch prediction unit and an instruction cache. The branch prediction unit is configured to form a first branch prediction for a first branch instruction based upon first branch prediction information. Additionally, the branch prediction unit is configured to store branch predictions and corresponding branch prediction information pertaining to branch instructions outstanding within an instruction processing pipeline of the microprocessor. Still further, the branch prediction unit is configured to assign a first branch tag to the first branch instruction identifying the first branch prediction information. Coupled to the branch prediction unit, the instruction cache is configured to store the first branch instruction.

BRIEF DESCRIPTION OF THE DRAWINGS

Other objects and advantages of the invention will become apparent upon reading the following detailed description and upon reference to the accompanying drawings in which.

Figure 1:
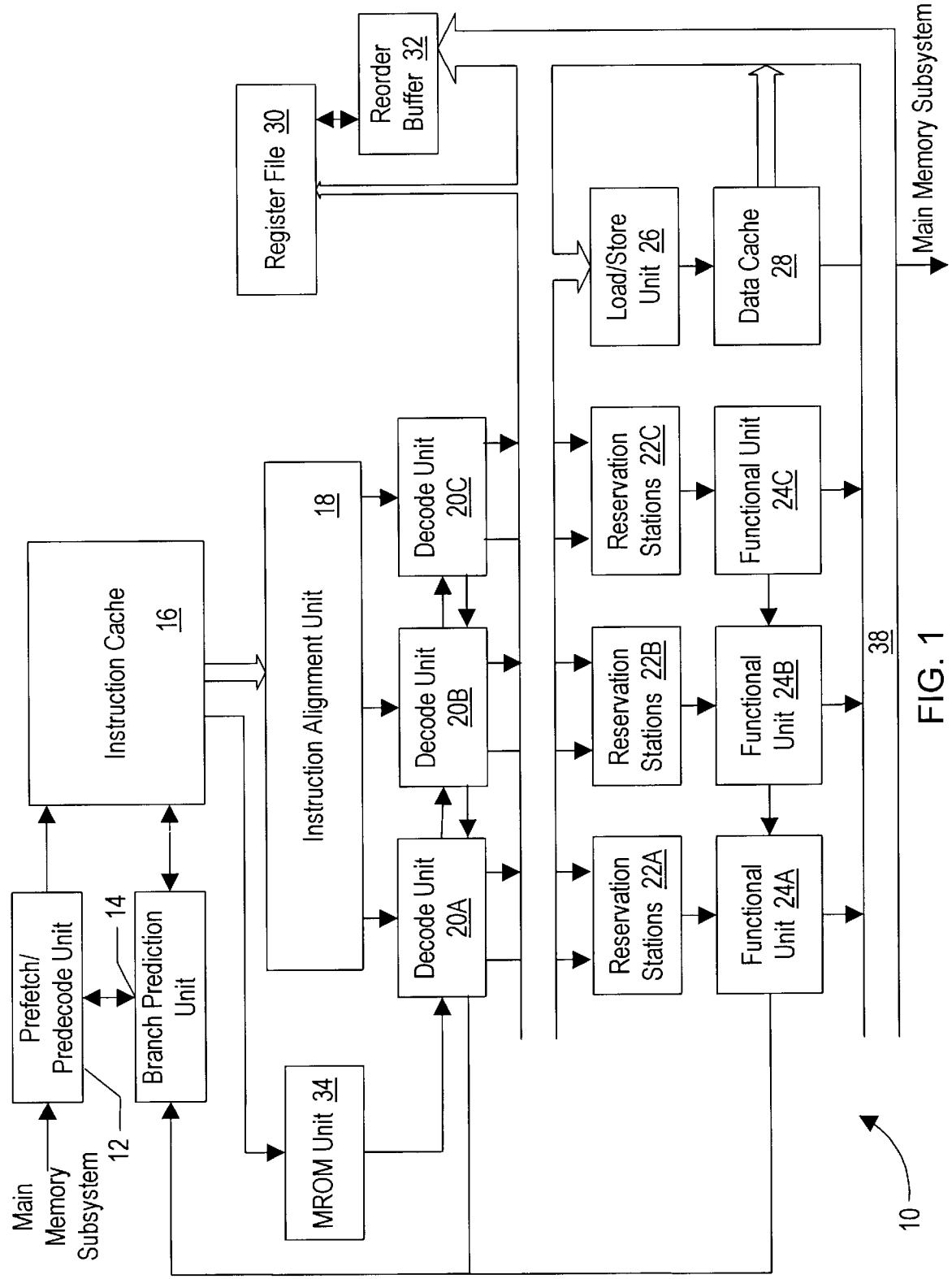
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, branch prediction unit 14 stores branch predictions and corresponding branch prediction information regarding branch instructions which are outstanding within the instruction processing pipeline of microprocessor 10. Branch prediction unit 14 assigns a branch tag to a branch instruction when the associated branch prediction is generated. The branch tag identifies the branch prediction and branch prediction information corresponding to the branch instruction. Instead of routing the branch prediction information with the branch instruction, the branch tag is routed. In cases in which the branch prediction information comprises a relatively large number of bits, the amount of information routed through the instruction processing pipeline of microprocessor 10 is advantageously reduced by routing the branch tag instead of the branch prediction information.

If the branch instruction is mispredicted, the branch tag is conveyed back to branch prediction unit 14. Branch prediction unit 14 may then discard branch prediction information corresponding to branch instructions which are subsequent to the mispredicted branch in the (incorrectly) predicted program order. Similarly, the branch tag may be conveyed to branch prediction unit 14 upon retirement of the branch instruction. Branch prediction unit 14 may then update the branch prediction information for the branch instruction to indicate the successful prediction.

Branch prediction unit 14 is configured to concurrently store a finite number of branch predictions. If the number of branch instruction outstanding within the instruction processing pipeline of microprocessor 10 reaches the finite number, branch prediction unit 14 stalls instruction dispatch into the instruction processing pipeline. The stall continues until the branch instruction which is foremost in program order among the branch instructions outstanding in the instruction processing pipeline retires or is detected to be mispredicted. Alternatively, a branch instruction other than the foremost branch instruction may be found to be mispredicted. Branch instructions subsequent to the mispredicted branch instruction are discarded and the positions of those branch instructions within branch prediction unit 14 are freed for storing new branch instructions. In one embodiment, branch prediction unit 14 comprises a storage for storing the outstanding branch predictions and branch prediction information. The storage includes a shift register for storing branch tags, and a corresponding shift register for the branch prediction information corresponding to the branch instruction to which the tag is assigned. Additionally, a valid shift register stores valid bits corresponding to each tag. As tags are assigned to branch instructions, a set valid bit is shifted into the valid shift register. The valid bit is reset if the branch is mispredicted or retires properly. If the valid bit at the head of the valid shift register (i.e. the valid bit corresponding to the foremost branch instruction when the finite number of branch instructions which are outstanding in the instruction processing pipeline) is set, then instruction dispatch is stalled by branch prediction unit 14.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed Lo reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
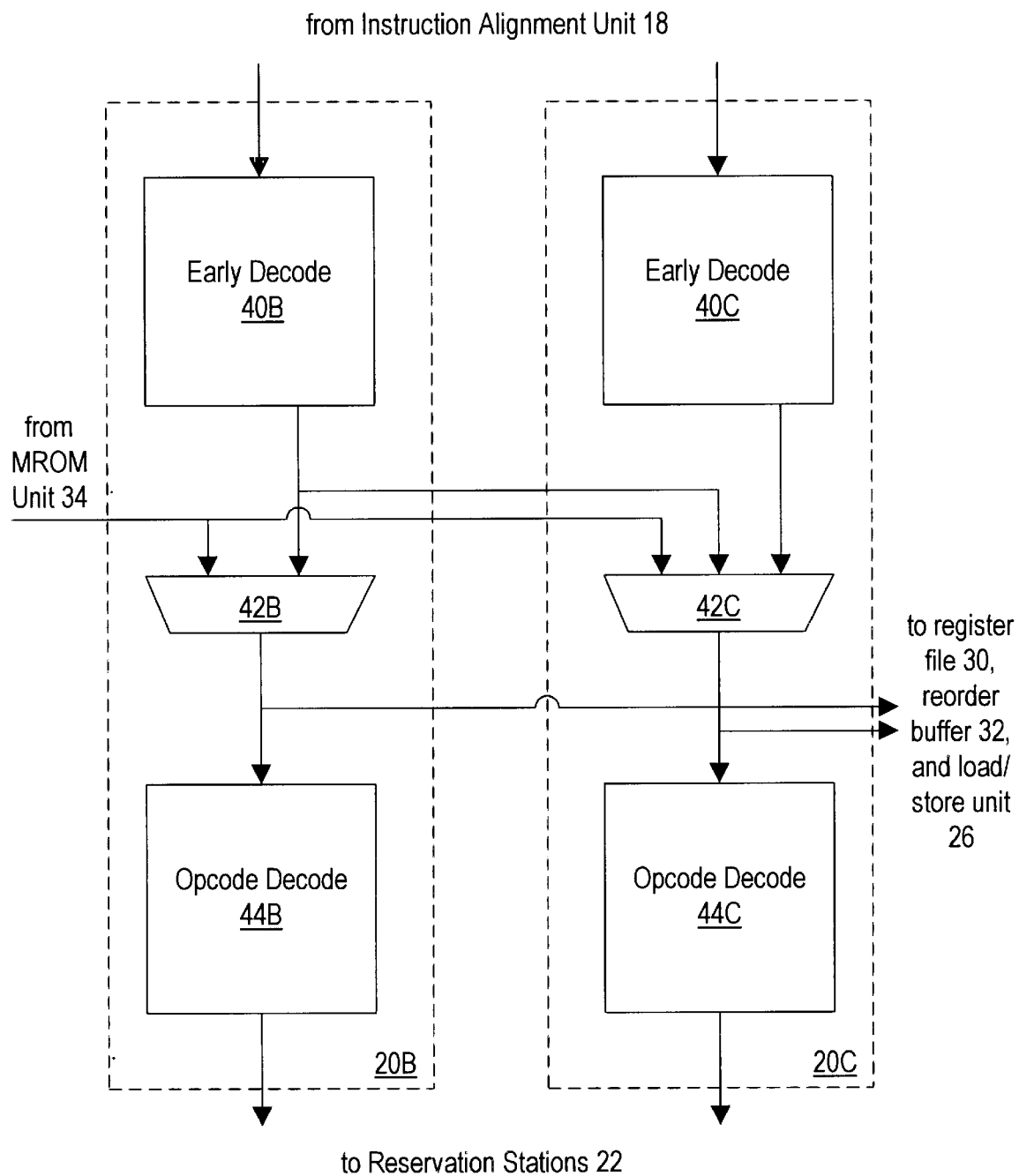
FIG. 2 is a block diagram of a portion of one embodiment of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
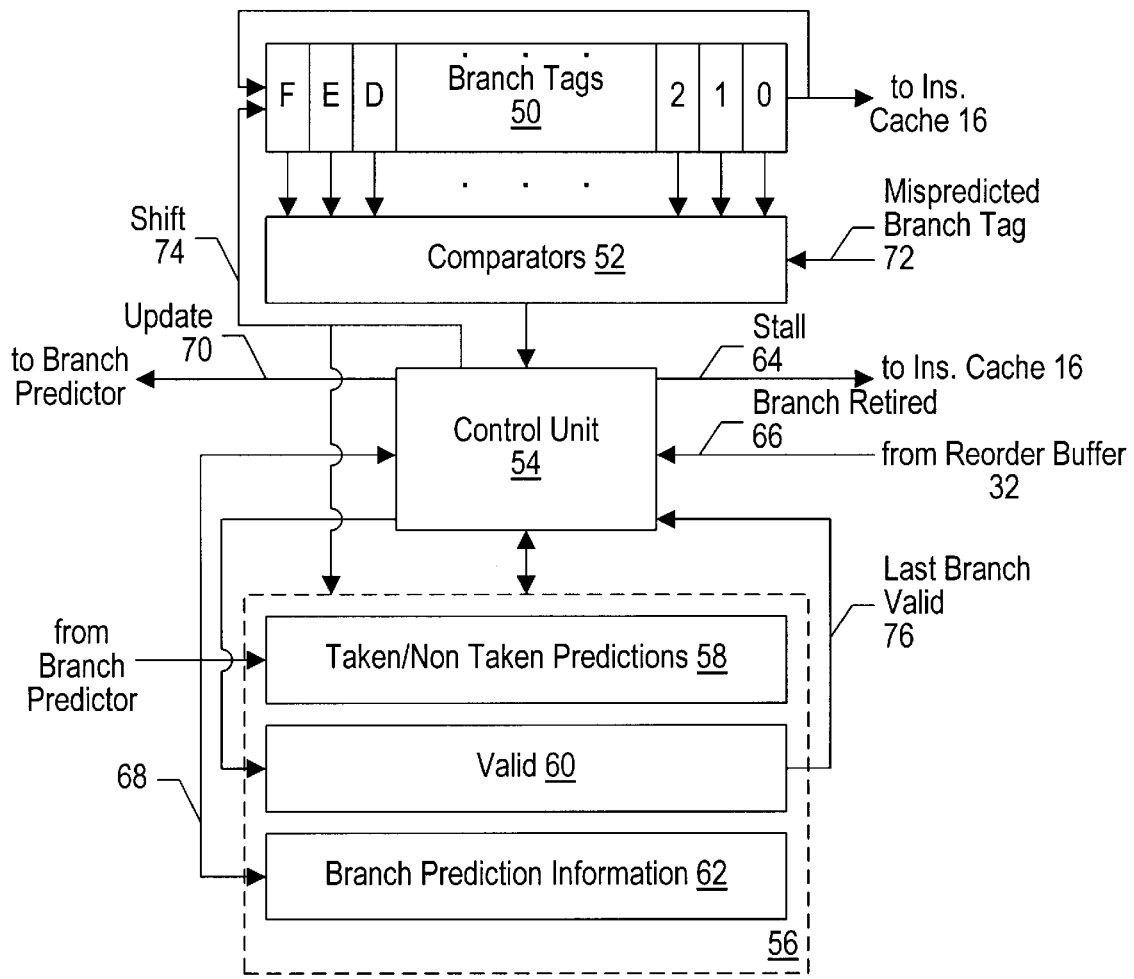
FIG. 3 is a block diagram of one embodiment of a branch prediction storage apparatus in accordance with the present invention.

Turning now to FIG. 3, a block diagram of a portion of one embodiment of branch prediction unit 14 is shown. Other embodiments of branch prediction unit 14 and the portion shown in FIG. 3 are contemplated. FIG. 3 depicts a branch tags shift register 50, a comparator block 52, a control unit 54, and a storage 56. As shown in FIG. 3, storage 56 includes a taken/not-taken shift register 58, a valid shift register 60, and a branch prediction information shift register 62. Branch tags shift register 50 is coupled to comparator block 52 and to control unit 54. Comparator block 52 is coupled to control unit 54 as well. Additionally, control unit 54 is coupled to storage 56. A stall line 64 is depicted coupled between control unit 54 and instruction cache 16 (shown in FIG. 1). A branch retired bus 66 is coupled between control unit 54 and reorder buffer 32 (shown in FIG. 1). Additionally, branch prediction information is conveyed upon a bus 68 to storage 56 and control unit 54 from the branch predictor within branch prediction unit 14. Control unit 54 conveys updated branch prediction information upon an update bus 70 to the branch predictor. Exemplary branch predictors are described in further detail below. A mispredicted branch tag bus 72 is coupled to comparator block 52.

The elements shown in FIG. 3 operate together to assign branch tags to branch instructions, to detect indications of misprediction and/or retirement of branch instructions, and to provide updated branch prediction information to the branch predictor within branch prediction unit 14. As one or more instructions are fetched from instruction cache 16, branch prediction information stored with respect to the fetched instructions is used by the branch predictor to form a branch prediction. Instruction cache 16 uses the predicted address as a fetch address during a subsequent clock cycle. Furthermore, the branch prediction information used to form the branch prediction is conveyed upon bus 68. Exemplary branch prediction information is described further below.

Upon receipt of branch prediction information from the branch predictor, control unit 54 assigns the branch tag stored at the head of branch tags shift register 50 to the branch instruction being predicted. Instruction cache 16 receives the branch tag stored at the head of branch tags shift register 50 and conveys the branch tag with the branch instruction into the instruction processing pipeline of microprocessor 10. In addition to assigning the branch tag, control unit 54 asserts a shift signal upon a shift line 74 coupled to branch tags shift register 50 and to storage 56. Branch tags shift register 50 and storage 56 shift the information stored therein in response to the asserted shift signal. The head of branch tags shift register 50 is coupled to the tail of branch tags shift register 50. Therefore, the branch tag assigned during a given clock cycle is shifted into the tail of branch tags shift register 50. Effectively, a rotation of branch tags shift register 50 is performed upon assertion of the shift signal.

Generally speaking, a shift register is a set of serially connected storage locations. One storage location (the "tail" of the shift register) receives an input to the shift register. Another storage location is the output of the shift register (the "head" of the shift register). Each storage location is coupled to receive a value from one of the other storage locations and is coupled to provide the value stored therein to another of the other storage locations. Upon assertion of a shift input to the shift register, the contents of a particular storage location are shifted into the storage location connected thereto for receiving the contents of the particular storage location. Additionally, the contents of another storage location connected to provide its contents to the particular storage location are stored into the particular storage location. The location at the tail of the shift register stores the input value upon assertion of the shift signal.

In an alternative implementation, a shift register may be simulated using a storage which does not shift its entries. Instead, a storage having a head and tail pointer may be used. The tail pointer indicates the next branch tag to be assigned. The tail pointer is incremented upon dispatch of a branch instruction. The head pointer indicates the next branch instruction to retire. The head pointer is incremented upon retirement of a branch instruction. Upon branch misprediction, the tail pointer is adjusted to the mispredicted tag plus one.

Branch tags register 50 initially stores a set of branch tags "0" through "F" in the embodiment shown in FIG. 3. Therefore, up to sixteen branch instructions may be concurrently outstanding within the instruction processing pipeline of microprocessor 10. Branch tag "0" is the first tag to be assigned, followed by branch tag "1", etc. As branch tags are assigned from the head of branch tags shift register 50, the tags are rotated to the tail of branch tags shift register 50. Additionally, the tail of storage 56 stores the branch prediction information associated with the branch instruction being predicted when the shift signal is asserted. As additional branch instructions are predicted, the branch tags within branch tags shift register 50 are rotated. The corresponding branch prediction information is shifted within storage 56 such that the branch prediction information remains stored in a storage location within storage 56 which corresponds to the storage location within branch tags shift register 50 in which the branch tag is stored. For example, in the particular embodiment described above, sixteen branch tags are stored in branch tags shift register 50. Therefore, storage 56 includes sixteen storage locations for branch prediction information. Each storage location within storage 56 is associated with a particular storage location within branch tags register 50.

In the embodiment shown in FIG. 3, storage 56 comprises three shift registers. Taken/not-taken shift register 58 stores the taken/not-taken prediction for each branch instruction represented within storage 56. In one embodiment, the taken/not-taken prediction comprises a bit indicative, when set, that the branch instruction is predicted taken. When clear, the bit indicates that the branch instruction is predicted not taken. Valid shift register 60 stores a valid indication for each branch instruction. If the valid indication is in a valid state, then the corresponding taken/not-taken prediction and branch prediction information is valid (i.e. corresponds to a branch instruction which is outstanding within the instruction processing pipeline of microprocessor 10). Alternatively, if the valid indication is in the invalid state then the corresponding taken/not-taken prediction and branch prediction information is invalid (i.e. does not correspond to a branch instruction which is outstanding within the instruction processing pipeline of microprocessor 10). In one embodiment, the valid indication comprises a bit indicative, when set, of validity and indicative, when clear, of invalidity. Branch prediction information used to form the taken/not-taken prediction stored in taken/not-taken shift register 58 is stored in branch prediction information register 62.

Branch tags become deallocated (e.g. free for allocation to another branch prediction) upon detection of a mispredicted branch instruction or upon retirement of a branch instruction. Comparator block 52 is used for identifying a mispredicted branch instruction within branch prediction unit 14. Mispredicted branch tag bus 72 conveys the branch tag of a branch instruction which was mispredicted. In one embodiment, the taken/not-taken prediction for the branch instruction is conveyed along with the branch instruction into the instruction processing pipeline of microprocessor 10. If, upon execution of the branch instruction, the taken/not-taken prediction is found to be incorrect, then the branch tag of the branch instruction is conveyed upon mispredicted branch tag bus 72. Alternatively, mispredicted branch tag bus 72 may convey a result of executing the branch instruction along with the branch tag. Comparator block 52 then includes a comparison of the prediction (from taken/not-taken shift register 58) in the comparison. A misprediction is determined if the branch tags match and the prediction does not match the execution result. Mispredicted branch tag bus 72 may further include a valid line for indicating that a branch tag is being conveyed thereon. In one embodiment, functional units 24 report the mispredicted branch to reorder buffer 32, which forwards the mispredicted branch tag upon mispredicted branch bus 72. In another embodiment, functional units 24 conveyed the mispredicted branch tag directly. It is noted that, because some branch instructions may not be represented within the branch prediction information stored with respect to a cache line, early decode units 40 provide branch misprediction information as well. More particularly, early decode units 40 detect unconditional branch instructions for which the branch prediction was not made. In this manner, recovery from these types of mispredictions may be more rapid than taken/not-taken misprediction recovery.

Comparator block 52 includes a comparator circuit for each storage location within branch tags shift register 50. The comparator compares the branch tag within that storage location to the mispredicted branch tag conveyed upon mispredicted branch tag bus 72. The result of the comparisons is conveyed to control unit 54, from which the position of the branch prediction information corresponding to the mispredicted branch instruction within storage 56 may be identified. Because the branch instruction is mispredicted, branch instructions fetched subsequent to the mispredicted branch instruction lie within an incorrectly predicted instruction stream. These branch instructions are discarded by reorder buffer 32 upon detection of the mispredicted branch, and likewise should be discarded from storage 56. Therefore, control unit 54 resets the valid bits corresponding to branch instructions which are subsequent to the mispredicted branch instruction to the invalid state. Since storage 56 and branch tags register 50 are implemented as shift registers in the present embodiment, those valid bits between the tail of storage 56 and the location identified by comparator block 52 are reset.

In addition to resetting the valid bits as described above, control unit 54 adjusts branch tags shift register 50 and storage 56 in response to a mispredicted branch instruction. In particular, control unit 54 rotates the branch tags such that the branch tag subsequent to the mispredicted branch tag is at head of branch tags shift register 50. Storage 56 is adjusted accordingly, such that the branch prediction information corresponding to each branch tag is in a storage location within storage 56 which is associated with the storage location within branch tags shift register 50 storing that branch tag. For example, storage 56 and branch tags shift register 50 may be configured to shift in either direction in response to different shift signals from control unit 54. In order to recover from branch misprediction, a shift backwards may be performed. Alternatively, control unit 54 may be configured to reload the recovered state into the shift register storages. It is noted that control unit 54 may additionally convey updated branch prediction information upon update bus 70 in response to a mispredicted branch instruction.

Branch retired bus 66 conveys an indication from reorder buffer 32 that a branch instruction is being retired. Upon receipt of the retirement indication, control unit 54 resets the valid bit for the corresponding branch prediction information. Additionally, the branch prediction information is updated to indicate the successful branch prediction and is conveyed upon update bus 70 to the branch predictor. For example, branch prediction counters may be incremented or decremented based upon the taken/not-taken nature of the execution of the branch instruction. It is noted that the branch prediction information conveyed from the branch predictor upon fetch of the branch instruction may already be updated in response to the branch prediction. In such an embodiment, control unit 54 simply conveys the updated information to the branch predictor without attempting any modification.

In the embodiment described in FIG. 1, microprocessor 10 retires instructions in the original program order. Therefore, branch retired bus 66 may comprise a signal asserted to indicate that a branch instruction is being retired. When the signal is asserted, control unit 54 locates the valid bit nearest the head of storage 56 which is set. The corresponding branch prediction information is conveyed upon update bus 70 and the valid bit is reset. Alternatively, the branch tag of the branch instruction being retired may be conveyed upon branch retired bus 66. A set of comparator circuits similar to comparator block 52 may be used to identify the storage location storing the branch tag.

Control unit 54 receives the valid bit stored at the head of valid shift register 60 upon last branch valid line 76. If the valid bit is set, then all of the branch tags within branch tags shift register 50 are assigned to branch instructions which are outstanding within the instruction processing pipeline of microprocessor 10. No storage space is available to store information regarding additional branch instructions. Therefore, control unit 54 asserts a stall signal upon stall line 64 to instruction cache 16. Instruction cache 16 stalls instruction fetching upon receipt of an asserted stall signal, thereby averting the potential fetch of a branch instruction for which a branch tag is not available. When the valid bit at the head of valid shift register 60 indicates invalid (through branch misprediction or retirement of a branch instruction), the stall signal is deasserted and instruction fetch continues.

In another embodiment, a branch tag is assigned to each cache line of instructions as the instructions are fetched from instruction cache 16. Since branch prediction information is cache-line based, information is stored for each cache line for subsequent update based upon misprediction or retirement of the instructions in the line.

Figure 4:
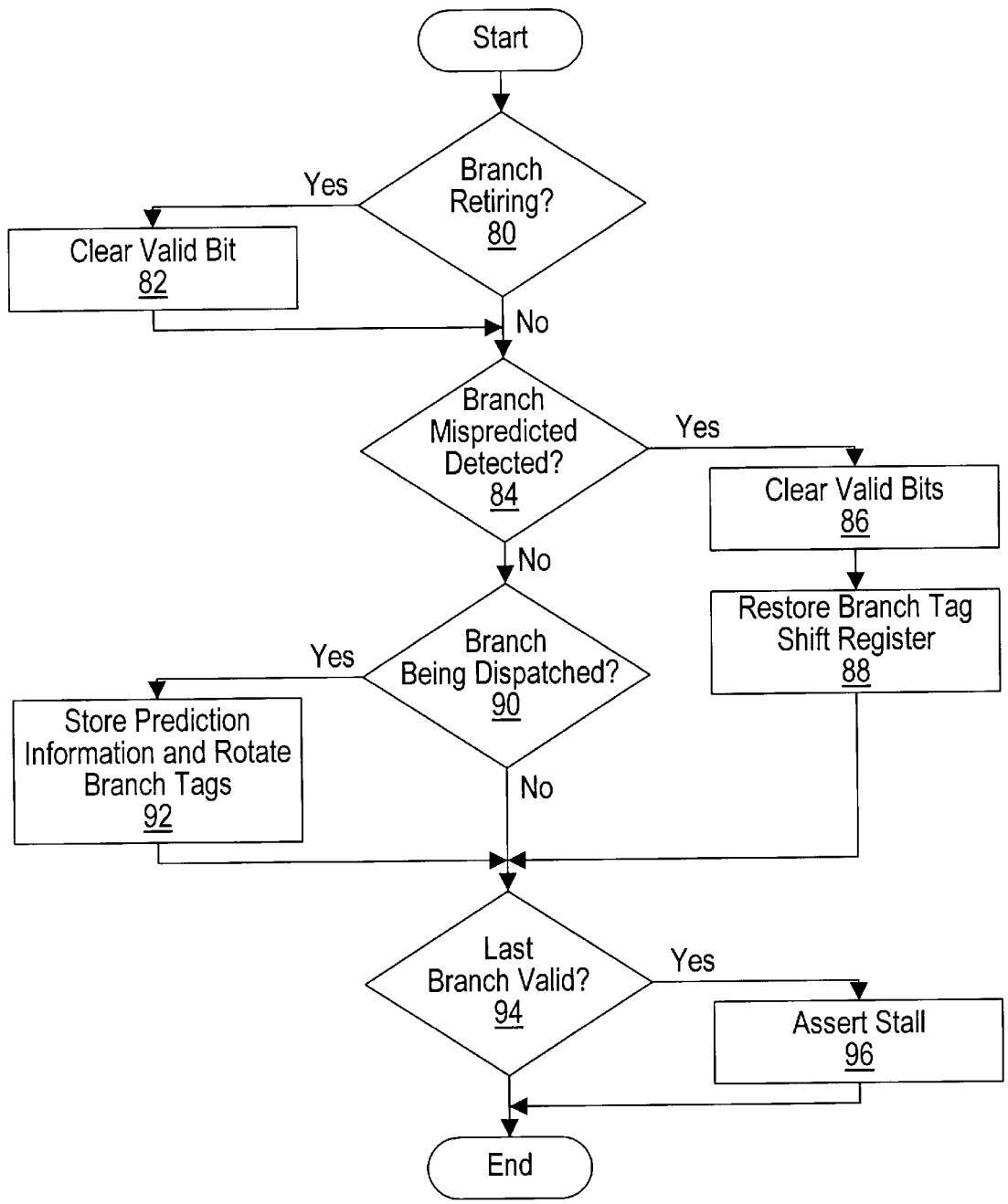
FIG. 4 is a flowchart illustrating operation of one embodiment of a control unit shown in FIG. 3.

Turning next to FIG. 4, a flowchart illustrating the operation of one embodiment of control unit 54 is shown. Other embodiments are contemplated, and control unit 54 may perform additional functions as well. Control unit 54 detects a retiring branch instruction as indicated by reorder buffer 32 (decision block 80). If a branch instruction is retiring, control unit 54 clears the corresponding valid bit within valid shift register 60 (step 82). As illustrated by decision block 84, control unit 54 detects a mispredicted branch instruction. The branch tag of the mispredicted branch instruction is received upon mispredicted branch tag bus 66 and is compared to the branch tags in branch tags shift register 50 if a mispredicted branch instruction is indicated. Upon detection of a mispredicted branch, the valid bits for branch instructions between the mispredicted branch instruction and the tail of storage 56 are reset (step 86). Additionally, branch tag shift register 50 and storage 56 are restored as described above, such that the newly freed branch tags are available for subsequent instruction dispatch (step 88).

If a branch misprediction is not detected, then control unit 54 determines if a branch instruction is being dispatched (decision block 90). If so, the prediction information is shifted into storage 56 and branch tags shift register 50 is rotated (step 92). It is noted that, if a branch misprediction is detected concurrent with a branch instruction being dispatched, the dispatched branch instruction is ignored. Since the branch instruction being dispatched is part of the mispredicted instruction stream, the branch instruction is not added to the instructions outstanding within the instruction processing pipeline.

Finally, as illustrated by decision block 94, control unit 54 determines if the valid bit at the head of valid shift register 60 is set (i.e. if the finite number of branch instructions which may be concurrently outstanding within the instruction processing pipeline has been reached). If so, then the stall signal is asserted (step 96).

Figure 5:
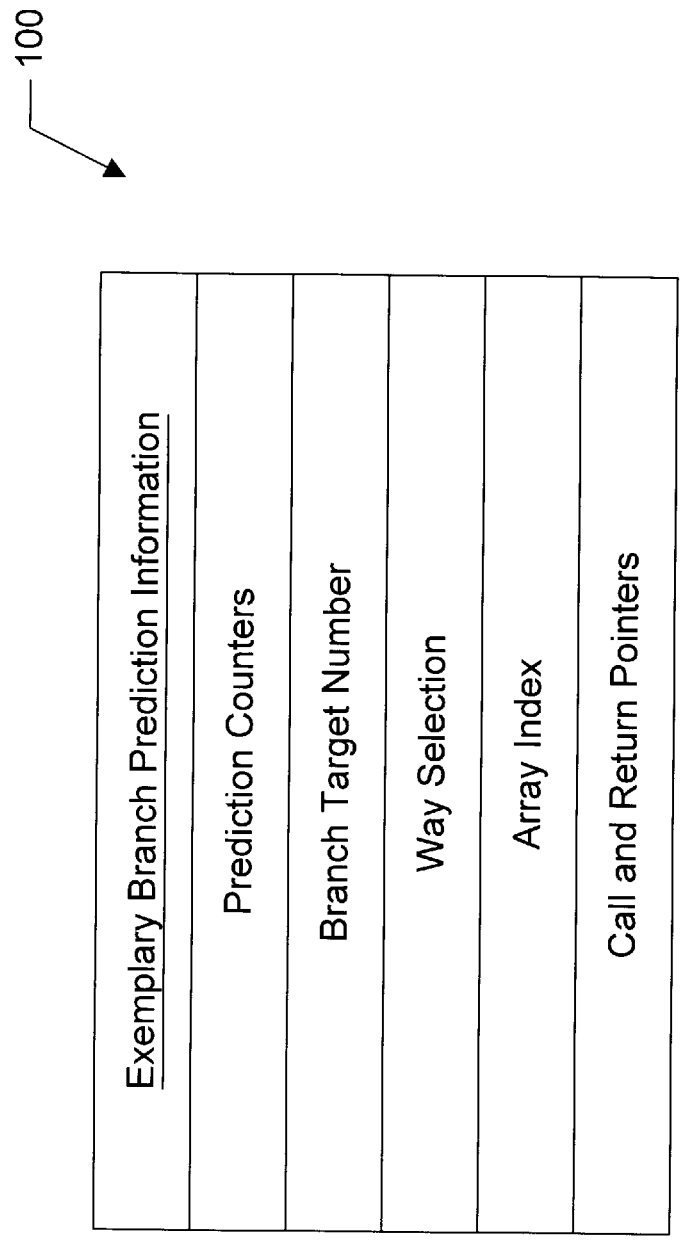
FIG. 5 is a table listing exemplary information stored in the branch prediction apparatus shown in FIG. 3 according to one embodiment of the branch prediction storage apparatus.

Turning now to FIG. 5, exemplary branch prediction information stored in branch prediction information shift register 62 is shown in a table 100. It is noted that other contemplated embodiments may include other branch prediction information and may not include the information listed in table 100. The exemplary information includes one or more prediction counters, a branch target number, a way selection, an array index, and call and return pointers. A prediction counter is used to track a history of the most recent executions of the branch instruction. For example, the prediction counter may be incremented each time the branch instruction is taken and decremented each time the branch instruction is not taken. The prediction counter saturates at both a maximum and a minimum value, such that further increments of the maximum value or decrements of the minimum value have no effect upon the counter value. A branch prediction may be formed based upon the values of the counters. For example, a two bit saturating counter may be employed and the most significant bit may be used as the taken/not taken prediction. If the most significant bit is set, the branch instruction is predicted taken. Conversely, the branch instruction is predicted not-taken if the most significant bit is clear.

In one particular embodiment, microprocessor 10 employs a combined global and cache-line based branch prediction mechanism. Three prediction counters are employed: a taken/not-taken counter from the global portion of the branch prediction mechanism, a taken/not-taken counter from the cache-line based portion of the branch prediction mechanism, and a prediction select counter used to select between the two aforementioned counters for forming a branch prediction. The global portion of the branch prediction mechanism creates an index into an array of global branch prediction counters. The index is created by exclusive ORing a history of the "N" most recent branch taken/not-taken results with a portion of the instruction fetch address. The counter thus selected may be used to form the branch prediction for the instructions being fetched. The cache-line based branch prediction mechanism includes one or more prediction counters stored with the instruction cache line.

As opposed to using a prediction counter for the cache-line based prediction mechanism, local prediction may be used. In local prediction, the most recent "N" taken/not-taken branch predictions made for a particular branch instruction are saved. Each time the particular instruction is fetched, a prediction is shifted from the local prediction value and is used as the prediction for the present fetch.

Branch prediction unit 14 monitors the correctness of the global prediction counter and the cache-line based prediction counter for each branch prediction. If the global prediction counter predicts incorrectly and the cache-line based prediction counter predicts correctly, the prediction selector counter is decremented. If the global prediction counter predicts correctly and the cache-line based counter predicts incorrectly, the prediction selector counter is decremented. Branch prediction unit 14 uses the most significant bit of the prediction selector counter to select which of the two counters to use for forming the branch prediction. If the most significant bit is set, the cache-line based prediction counter is used. Conversely, the global prediction counter is selected if the most significant bit of the prediction selector counter is clear.

The branch target number is included for embodiments which store more than one set of branch prediction information for each cache line of instructions. The branch target number indicates which of the set was used as the branch prediction. In this manner, the cache-line based information which was actually used to form the branch prediction may be updated in response to execution of the branch instruction.

The way selection and array index of the fetch address for which the branch prediction is formed are also stored. The array index selects the row of the instruction cache from which the branch prediction information is drawn, and the way selection indicates the way of a set associative instruction cache from which the information is drawn. The array index and way selection are used for updating the branch prediction information with respect to execution of the branch instruction. It is noted that the way selection is not used in embodiments of microprocessor 10 employing a direct mapped instruction cache 16. It is further noted that two array indices may be stored: one array index identifies a row within instruction cache 16 while the second array index identifies a row within a global counter storage associated with the global branch prediction.

According to one particular embodiment, call and return pointers are included in the branch prediction information stored in branch prediction information shift register 62. The call pointer indicates a position within the return stack storage (shown in FIG. 8) which was the top of the return stack when the corresponding branch tag was assigned. The return pointer indicates the position within the return stack storage which is to be discarded upon retiring a return instruction corresponding to the branch tag. The return pointer may indicate any location within the return stack depending upon the contents thereof. These values may advantageously be used to recover the return stack storage upon branch misprediction (call pointer and return pointer) or retirement of the instruction (return pointer). The return stack therefore need not employ hardware for locating the entries which are to be updated upon occurrence of these events. Instead, the call or return pointer may be conveyed from branch prediction information shift register 62.

Figure 6:
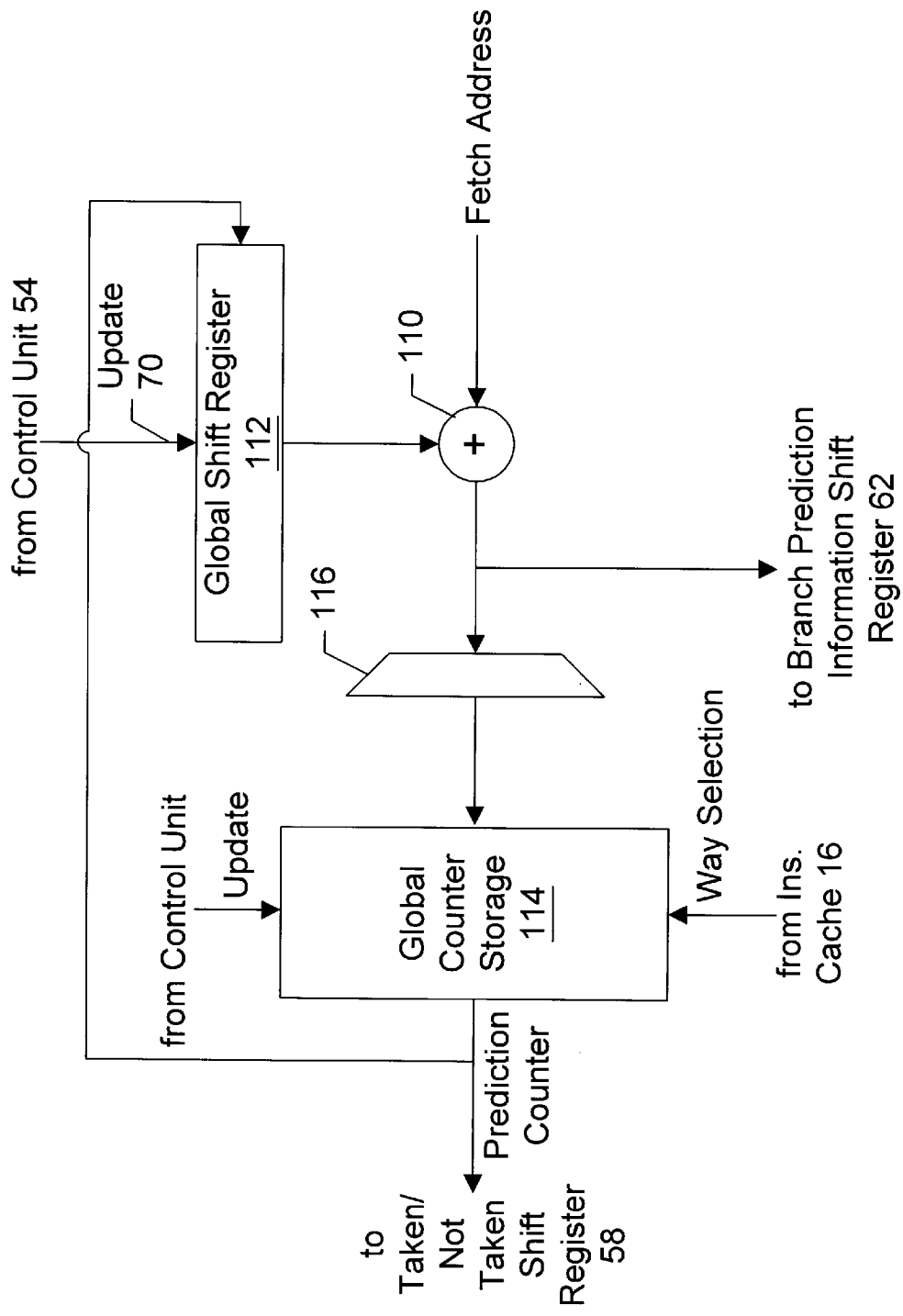
FIG. 6 is a block diagram of a global branch prediction mechanism which may interface with the branch prediction storage apparatus shown in FIG. 3.

Turning now to FIG. 6, a block diagram of the global portion of the branch predictor employed by one embodiment of branch prediction unit 14 is shown. The fetch address being presented to instruction cache 16 during the clock cycle is presented to an exclusive OR (XOR) 110. Additionally presented to XOR 110 is the contents of a global shift register 112. Global shift register 112 stores the most recent "N" taken/not-taken branch predictions. In one embodiment, "N" is eight. Generally speaking, "N" is equal to the number of bits from the fetch address which are used to index into a global counter storage 114. In one particular embodiment, global counter storage 114 is an array configured with the same cache geometry (i.e. rows and columns) as instruction cache 16. Global counter storage 114 stores a global prediction counter at each storage location therein. It is noted that XOR 110 receives the index bits of the fetch address, according to the present embodiment.

The result of XOR 110 is transmitted to a decoder circuit 116 which decodes the result into a set of row select signals for global counter storage 114. A row from global counter storage 114 is thus selected. One of the columns (or "ways") of global counter storage 114 is selected according to the way of instruction cache 16 which stores the instructions being fetched in accordance with the fetch address received by XOR 110. In other words, the way selection provided to global counter storage 114 is the way of instruction cache 16 in which the fetch address hits. Given the index (from XOR 110 through decoder 116) and a way selection, one global prediction counter is read from global counter storage 114. The most significant bit is used as a taken/not-taken prediction (for storage in taken/not-taken shift register 58 if the global prediction counter is selected). Additionally, the most significant bit is shifted into global shift register 112. The oldest of the taken/not-taken predictions stored in global shift register 112 is concurrently shifted out.

By XORing the most recent taken/not-taken branch behavior with the fetch address, more than one global branch prediction may be accessed using the same fetch address. In this manner, the branch predictions formed by the global branch prediction mechanism depend not only on the fetch address but also on the branch behavior experienced by the program prior to fetching the branch instruction. If the taken/not-taken nature of the branch instruction is different depending upon the path taken through the instruction stream to arrive at the branch instruction, then the global branch prediction mechanism may result in a higher branch prediction accuracy for microprocessor 10.

Upon detection of a branch misprediction, global shift register 112 is recovered to the pattern of taken/not-taken branches prior to the mispredicted branch instruction. Control unit 54 conveys the pattern (selected from taken/not-taken storage 58) upon update bus 70 upon detection of the mispredicted branch instruction. The pattern is stored into global shift register 112. Additionally, update bus 70 is coupled to global counter storage 114. An updated global counter is conveyed upon update bus 70 for mispredicted branches and retiring branches. Additionally, the array index and way selection used to access global counter storage 114 to generate the original prediction is conveyed upon update bus 70 to global counter storage 114. In this manner, the correct global prediction counter may be located within global counter storage 114 for update. The output of XOR 110 is shown in FIG. 6 as being transmitted to branch prediction information shift register 62 for storage, such that subsequent update of global counter storage 114 may be effected.

Figure 7:
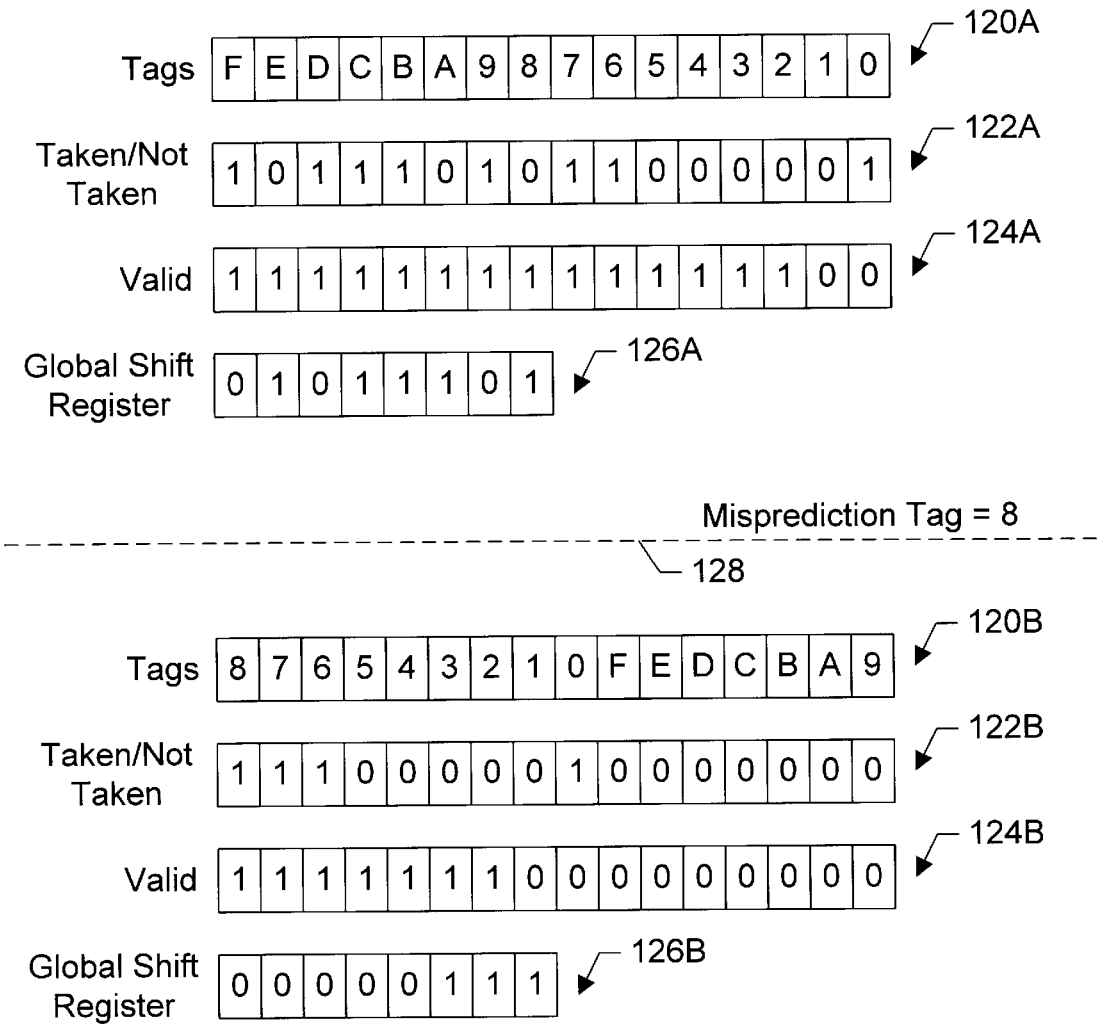
FIG. 7 is an example of the operation of the global branch prediction mechanism shown in FIG. 6 and the branch prediction storage apparatus shown in FIG. 3.

Turning next to FIG. 7, an example of the operation of the apparatus shown in FIG. 3 in conjunction with the global branch predictor shown in FIG. 6 is depicted. Initial values stored in branch tags shift register 50 (reference numeral 120A), taken/not-taken shift register 58 (reference numeral 122A), valid shift register 60 (reference numeral 124A), and global shift register 112 (reference numeral 126A) are shown. A horizontal dashed line 128 separates the initial values from the values subsequent to a misprediction detected for the branch instruction assigned branch tag "8". The contents of branch tags shift register 50, taken/not-taken shift register 58, valid shift register 60, and global shift register 112 subsequent to recovery procedures based on the mispredicted branch tag are shown as reference numerals 120B–126B.

In the example of FIG. 7, branch tags "2" through "F" are associated with outstanding branch instructions prior to detection of a misprediction. Valid bits for each of these tags are set, while the valid bits for branch tags "0" and "1" are clear. Corresponding taken/not-taken predictions are shown at reference numeral 122A. Additionally, the global shift register contains the eight most recent taken/not-taken predictions. At reference numeral 126A, the taken/not-taken predictions corresponding to branch tags "F" through "8" are shown stored in the global shift register. It is noted that the taken/not-taken predictions are shown in the global shift register to be in the opposite order of the taken/not-taken predictions shown at reference number 122A. The orders shown in FIG. 7 are consistent with the drawings in which the branch prediction information is shifted into storage 56 from the left while predictions are shifted into the global shift register from the right. As shown, the most recent prediction is XOR'd with the least significant bit of the fetch address provided to the global prediction mechanism. However, the opposite order may be implemented as well.

Upon detection of the branch misprediction for the branch instruction having a branch tag of "8", control unit 54 resets the valid bits for each branch tag assigned to an instruction which is more recent (in program order) than the branch instruction having a branch tag of "8". In FIG. 7, the branch tags "F" through "9" have their valid bits reset. In addition, the branch tags register is rotated and the other registers shifted back such that branch tag "9" is available for assignment again (leading to the values shown at reference numerals 120B–124B). Furthermore, control unit 54 reverses the taken/not-taken prediction corresponding to branch tag "8" since the original prediction is incorrect. Control unit 54 conveys the taken/not-taken predictions for branch tags "8" through "1" upon update bus 70 to global shift register 112, thereby updating global shift register 112 to the value shown at reference number 126B. The updated value is consistent with taken/not-taken shift register 58. Therefore, global shift register 112 has been recovered from the branch misprediction.

Figure 8:
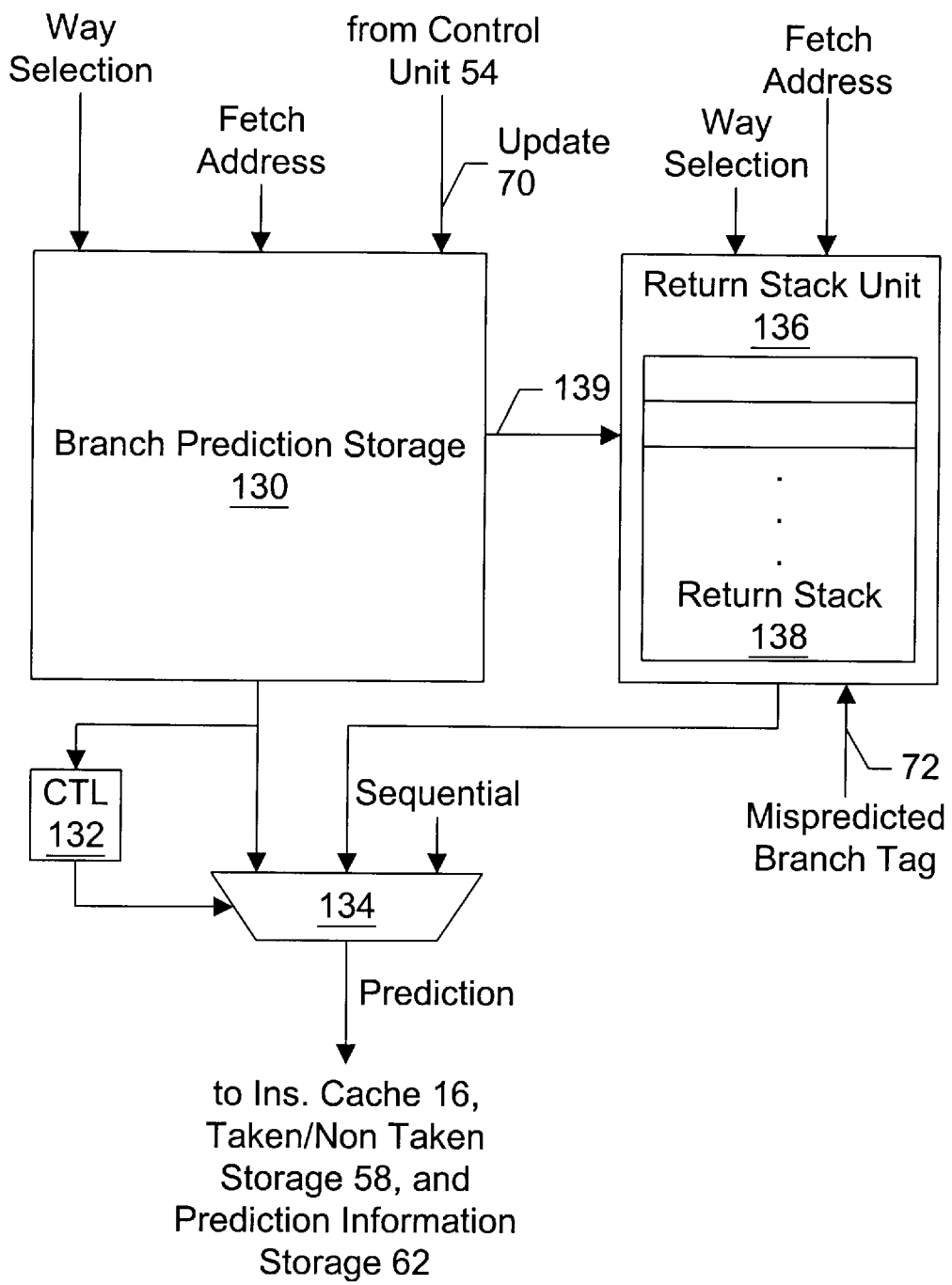
FIG. 8 is a block diagram of a branch prediction mechanism which may interface with the branch prediction storage apparatus shown in FIG. 3.

Turning now to FIG. 8, a block diagram of one embodiment of a cache-line based branch prediction mechanism is shown. A branch prediction storage 130 is shown, as well as a control unit 132 and a multiplexor 134. Branch prediction storage 130 is configured with the same geometry (i.e. rows and columns) as instruction cache 16 for the embodiment shown. During normal operation, the fetch address being accessed in instruction cache 16 is concurrently presented to branch prediction storage 130. Additionally, the way selection provided to instruction cache 16 (for example, via way prediction as noted above or via tag comparisons in a conventional instruction cache) is provided to branch prediction storage 130. In this manner, a storage location within branch prediction storage 130 is selected.

Figure 9:
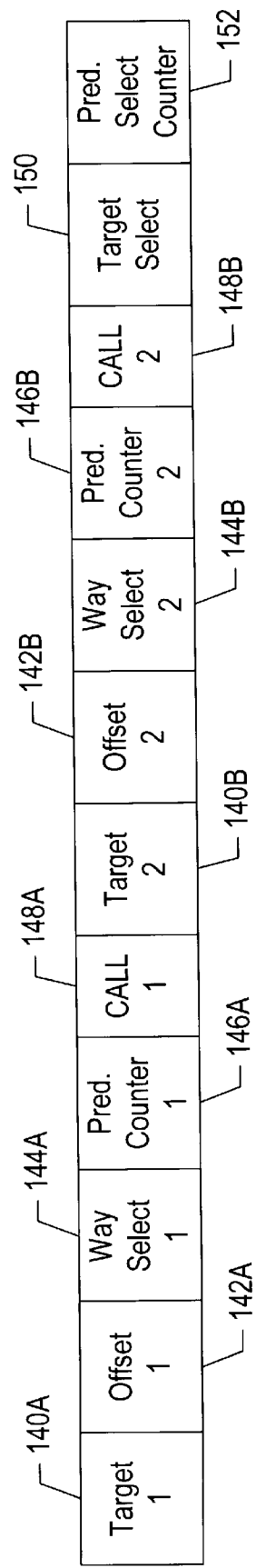
FIG. 9 is a diagram depicting information stored in the branch prediction mechanism shown in FIG. 8 according to one embodiment of the branch prediction mechanism.

The selected storage locations stores one or more branch predictions corresponding to branch instructions within the instruction cache line. In one particular embodiment, two branch predictions are stored as shown in FIG. 9 below.

Additionally, the address from a return stack structure may be used, as well as the sequential address (i.e. the next cache line in memory). Information stored in the storage location is processed by control unit 132 to select one of the branch predictions stored in branch prediction storage 130, the return stack address, or the sequential address. The return stack is described in more detail below. Under the control of control unit 132, multiplexor 134 selects a branch prediction for conveyance to instruction cache 16, taken/not-taken shift register 58, and prediction information shift register 62. Instruction cache 16 uses the branch prediction (particularly the target address) in order to continue fetching instructions. Taken/not-taken shift register 58 and prediction information shift register 62 receive and store the selected branch prediction information.

Branch prediction storage 130 additionally receives update bus 70 from control unit 54. Update bus 70 is used to convey updated branch prediction information to branch prediction storage 130. In particular, the index and way selection of the cache line for which prediction information is to be updated is conveyed upon update bus 70. The index and way selection select the storage location within branch prediction storage 130 to be updated. Additionally, the branch prediction number is conveyed, selecting the branch prediction information within the selected storage location to be updated. Furthermore, the information to be updated is conveyed. In one embodiment, the information includes: a prediction counter for the cache-line based prediction, a prediction select counter for selecting between the cache-line based prediction and the global prediction, a target selection for selecting one of the multiple cache-line based branch predictions, a branch target address index (i.e. the predicted target address), an offset identifying the branch instruction within the instruction cache line, and a way selection for the branch target address index. Control unit 54 conveys update information upon update bus 70 when a corresponding branch instruction is retired.

In one embodiment, update information may be stored in a branch holding register (not shown). The update may be performed into the array of branch prediction storage 130 upon detection of a subsequent misprediction. The update may occur at this time because the corrected target address of the branch instruction is translated during the clock cycle subsequent to detection of the mispredicted branch. Therefore, the fetch address and way selection are invalid for a clock cycle. During this clock cycle, the updated information may be stored into the array using the same access port ordinarily used by the fetch address. A port for updating branch prediction storage 130 may be eliminated in this manner. The information in the branch holding register may be selected as the output for branch prediction storage 130 if the information is accessed prior to updating branch prediction storage 130.

As mentioned above, multiplexor 134 receives an input from a return stack unit 136 including a return stack storage 138. Return stack storage 138 is a stack structure storing return addresses corresponding to call instructions previously fetched by microprocessor 10. Furthermore, return stack storage 138 may store the branch tags of the corresponding call instruction and the return instruction for which the return address was used as a prediction. The return address nearest the top of return stack 138 which was not previously used as a prediction is conveyed to multiplexor 134. Additionally, if a call instruction is detected (as indicated by a call/return bus 139 from branch prediction storage 130, which also indicates return instructions), the return address corresponding to the call instruction is placed upon the top of the stack (the return address is the fetch address at the time the call instruction is fetched, and the way selection is stored as well). A pointer is used to indicate which of the entries is the top of the stack. Upon detection of a branch misprediction, the branch tag of the mispredicted instruction is conveyed to return stack unit 136 upon mispredicted branch tag bus 72. Return stack unit 136 discards entries for which the call branch tag is subsequent to the mispredicted branch tag and discards the return branch tags which are subsequent to the mispredicted branch tag. Furthermore, the branch tag corresponding to a retiring return instruction may be conveyed to return stack unit 136. The entry corresponding to the retiring return instruction may thereby be discarded. Additional details regarding a return stack may be found in the commonly assigned, copending patent application entitled: "Speculative Return Address Prediction Unit for a Superscalar Microprocessor", Ser. No. 08/550,296, filed Oct. 30, 1995 by Tran, et al.

Turning next to FIG. 9, a diagram depicting information stored in a storage location of one embodiment of branch prediction storage 130 is shown. The storage location includes a first branch target field 140A, a first offset field 142A, a first way selection field 144A, a first cache-line based prediction counter 146A, and a first call bit 148A. First branch target field 140A stores a first branch target address for a first branch instruction found within the corresponding cache line. It is noted that, according to one embodiment, only the index portion of the address (used to select a row in instruction cache 16) is stored. First offset field 142A stores an offset locating the first byte of the first branch instruction within the instruction cache line. The offset may be compared to the offset of the fetch address to determine if the branch prediction should be used or not. For example, if a fetch address having an offset larger than the offset stored in first offset field 142A is presented, then the branch instruction which generates the branch target address stored in first branch target field 140A may not be fetched in the current instruction cache access. Therefore, the branch prediction is likely to be wrong. First way selection field 144A stores the way of instruction cache 16 which is storing instruction bytes corresponding to the branch target address indicated by first branch target field 140A. First cache-line based prediction counter field 146A stores the prediction counter corresponding to first branch target field 140A. Finally, first call bit 148A indicates, when set, that the branch instruction indicated by fields 140A–146A is a subroutine call instruction. Branch prediction information for a second branch instruction is stored in fields 140B–148B, similar to fields 140A–148A for the first branch instruction.

In addition to multiple branch predictions, the storage location depicted in FIG. 9 includes a target select field 150 and a prediction select counter field 152. Prediction select counter field 152 stores the prediction select counter described above. Target select field 150 is examined by control unit 132 (shown in FIG. 8) to determine which target address to select. In one embodiment, target select field 150 comprises two bits encoded as shown in table 1 below:

TABLE 1

| Target Select Field Encoding | |
|---|---|
| Encoding | Meaning |
| 00 | Select sequential Address |
| 01 | Select return Stack |

TABLE 1-continued

| Target Select Field Encoding | |
|---|---|
| Encoding | Meaning |
| 10 | Select first Branch Prediction |
| 11 | Select second Branch Prediction |

It is noted that, as opposed to storing the offset of a branch instruction similar to offset fields 142, a branch selector value may be stored for each byte within the instruction cache line. The branch selector indicates which branch prediction should be used (similar to target select field 150) based upon the byte offset of the fetch address. The offset of the fetch address may be decoded to select the branch selector, which then selects the branch prediction for the cache line. The branch selectors are set based upon the branch instructions within the line. For example, if two branch instructions are within the line, then three regions are formed: a first region of instruction bytes prior to the first branch instruction; a second region of instruction bytes between the first branch instruction and the second branch instruction; and a third region of instruction bytes subsequent to the second branch instruction. Bytes in the first region receive a branch selector value indicating the first branch instruction. Bytes in the second region receive a branch selector value indicative of the second branch instruction. Bytes in the third region receive a branch selector value indicative of the sequential line.

Figure 10:
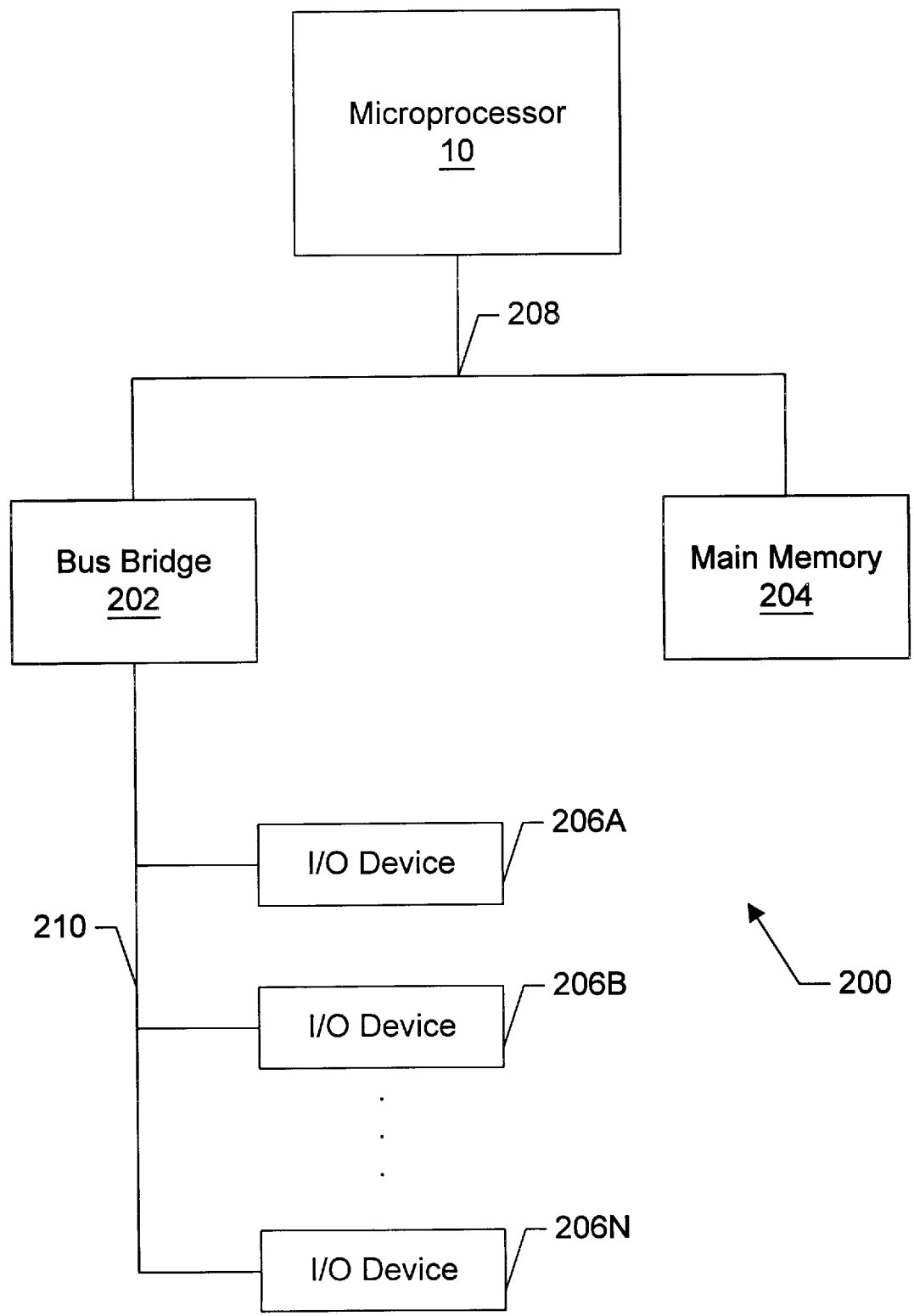
FIG. 10 is a block diagram of a computer system including the microprocessor shown in FIG. 1.

Turning now to FIG. 10, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 10 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is noted that, although various storages shown in FIG. 3 are referred to as shift registers, any storage which includes the capability of shifting data stored therein between storage locations may be employed. Still further, a storage which is not shifted but for which head and tail pointers are maintained indicating the head and tail values within the storage may be used. Additionally, branch prediction storage 130 may be integrated into the instruction storage array included in instruction cache 16, according to one implementation.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 2 below indicates fast path, double dispatch, and MROM instructions for one embodiment of microprocessor 10 employing the x86 instruction set:

TABLE 2 x86 Fast Path, Double Dispatch, and MROM Instructions

| X86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |

TABLE 2-continued x86 Fast Path, Double Dispatch, and MROM Instructions

| X86 Instruction | Instruction Category |
| --- | --- |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |

TABLE 2-continued x86 Fast Path, Double Dispatch, and MROM Instructions

| X86 Instruction | Instruction Category |
|---|---|
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al, now abandoned. The disclosure of this patent application is incorporated herein by reference in its entirety.

It is further noted that aspects regarding array Is circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran, now U.S. Pat. No. 5,619,464. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt, now abandoned; "Superscalar Microprocessor Including a High Performance Instruction Alignment Unit", Ser. No. 08/377,843, filed Jan. 25, 1995 by Witt, et al, now abandoned; "A Way Prediction Structure", Ser. No. 08/522,181, filed Aug. 31, 1995 by Roberts, et al, now abandoned; "A Data Cache Capable of Performing Store Accesses in a Single Clock Cycle", Ser. No. 08/521,627, filed Aug. 31, 1995 by Witt, et al.; "A Parallel and Scalable Instruction Scanning Unit", Ser. No. 08/475,400, filed Jun. 7, 1995 by Narayan, now abandoned; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

In accordance with the above disclosure, an apparatus for storing branch prediction information corresponding to branch instructions which are outstanding within the instruction processing pipeline of a microprocessor has been disclosed. The apparatus is employed within a branch prediction unit of the microprocessor, and a branch tag is transmitted with the branch instruction through the instruction processing pipeline. Advantageously, the amount of information conveyed through the pipeline for branch instructions may be substantially less than the amount of information used to generate and update branch predictions. Routing between the portions of the instruction processing pipeline may thereby be reduced while allowing more complex branch prediction information to be used for forming branch predictions.

Numerous variations and modifications will become apparent to those skilled in the art once the above disclosure is fully appreciated. It is intended that the following claims be interpreted to embrace all such variations and modifications.

What is claimed is:

1. An apparatus configured to store branch predictions comprising:

a storage configured to store branch prediction information used to generate a branch prediction for a branch instruction; and a control unit coupled to said storage, wherein said control unit is configured to selectively assign to said branch instruction a first branch tag identifying said branch prediction information within said storage, and wherein said first branch tag accompanies said branch instruction through an instruction processing pipeline.

2. The apparatus as recited in claim 1 further comprising a branch tags storage coupled to said control unit, wherein said branch tags storage is configured to store a plurality of branch tags including said first branch tag.

3. The apparatus as recited in claim 2 wherein said branch tags storage comprises a shift register having a head position and a tail position, and wherein said head position is coupled to said tail position.

4. The apparatus as recited in claim 3 wherein said first branch tag is stored in said head position, and wherein said control unit causes said shift register to shift upon assigning said first branch tag such that said first branch tag is moved to said tail position.

5. The apparatus as recited in claim 4 wherein said control unit is further configured to shift said storage such that said branch prediction information is stored in a position corresponding to a position within said branch tags register which stores said first branch tag.

6. The apparatus as recited in claim 5 wherein said storage is further configured to store a valid indicator corresponding to said branch instruction, wherein said control unit sets said valid indicator to a valid state upon assigning said first branch tag to said branch instruction.

7. The apparatus as recited in claim 6 wherein said valid indicator is shifted within said storage along with said branch prediction information.

8. The apparatus as recited in claim 7 wherein said control unit is coupled to receive a retirement indication corresponding to said branch instruction, and wherein said control unit is configured to set said valid indicator to an invalid state upon receipt of said retirement indication.

9. The apparatus as recited in claim 8 wherein said retirement indication comprises said first branch tag.

10. The apparatus as recited in claim 7 further comprising a plurality of comparator circuits coupled to said branch tag storage, wherein said plurality of comparator circuits are coupled to receive a mispredicted branch tag identifying a mispredicted branch instruction and to compare said mispredicted branch tag to said plurality of branch tags.

11. The apparatus as recited in claim 10 wherein said control unit is coupled to said plurality of comparator circuits, and wherein said control unit is configured to set said validity indicator to an invalid state if said mispredicted branch tag is said first branch tag, and wherein said control unit is configured to set said validity indicator to an invalid state if said mispredicted branch instruction is prior to said branch instruction in program order.

12. The apparatus as recited in claim 7 wherein said control unit is configured to examine a particular validity indicator at a head position of said storage, and wherein said control unit is configured to stall instruction dispatch into said instruction processing pipeline if said particular validity indicator is in a valid state.

13. The apparatus as recited in claim 1 wherein said branch instruction is further assigned a reorder buffer tag which identifies a location of said branch instruction within a reorder buffer, and wherein said reorder buffer tag is dissimilar from said branch tag.

14. The apparatus as recited in claim 1 wherein said branch tag is conveyed to a return stack unit, wherein said branch tag is stored by said return stack unit if said branch tag identifies a call instruction or a return instruction, whereby said return stack unit recovers from a branch misprediction by receiving a mispredicted branch tag and comparing said mispredicted branch tag to said branch tag stored within said return stack unit.

15. A method for handling branch predictions comprising:
   storing branch prediction information used to generate a branch prediction for a branch instruction in a storage;
   selectively assigning a branch tag to said branch instruction, wherein said branch tag identifies said branch prediction information within said storage;
   returning said branch tag to said storage upon retirement of said branch instruction; and
   deleting said branch prediction information from said storage subsequent to said returning.

16. The method as recited in claim 15 wherein said storing comprises setting a valid indicator to a valid state.

17. The method as recited in claim 16 wherein said deleting comprises setting said valid indicator to an invalid state.

18. The method as recited in claim 17 further comprising shifting said storage upon dispatch of additional branch instructions.

19. The method as recited in claim 18 further comprising stalling instruction dispatch if said valid indicator remains in said valid state when shifted to a head position of said storage.

20. The method as recited in claim 16 further comprising receiving an indication of a mispredicted branch instruction and setting said valid indicator to an invalid state if said mispredicted branch instruction is said branch instruction or is prior to said branch instruction in program order.

21. The method as recited in claim 15 wherein said assigning comprises selecting said branch tag from a head position of a branch tags shift register.

22. The method as recited in claim 21 further comprising shifting said branch tag to a tail position of said branch tags shift register upon said selecting.

23. The method as recited in claim 15 further comprising updating said branch prediction information within a branch predictor according to execution of said branch instruction.

24. A microprocessor comprising:
   a branch prediction unit configured to form a first branch prediction for a first branch instruction based upon first branch prediction information, wherein said branch prediction unit is configured to store branch predictions and corresponding branch prediction information pertaining to branch instructions outstanding within an instruction processing pipeline of said microprocessor, and wherein said branch prediction unit is configured to selectively assign a first branch tag to said first branch instruction identifying said first branch prediction information; and
   an instruction cache coupled to said branch prediction unit, wherein said instruction cache is configured to store said first branch instruction.

25. The microprocessor as recited in claim 24 wherein said branch prediction unit is configured to form said first branch prediction as said first branch instruction is fetched from said instruction cache.

26. The microprocessor as recited in claim 24 wherein said branch prediction unit employs a global branch prediction mechanism.

27. The microprocessor as recited in claim 24 further comprising a reorder buffer configured to store said first branch instruction while said first branch instruction is within said instruction processing pipeline of said microprocessor, and wherein said reorder buffer is configured to assign a reorder buffer tag to said first branch instruction identifying a storage location within said reorder buffer storing said first branch instruction, and wherein said reorder buffer tag is dissimilar from said branch tag.

\* \* \* \* \*